(12) United States Patent
Matsui et al.

(10) Patent No.: US 7,613,401 B2
(45) Date of Patent: *Nov. 3, 2009

(54) OPTICAL FM SOURCE BASED ON INTRA-CAVITY PHASE AND AMPLITUDE MODULATION IN LASERS

(75) Inventors: Yasuhiro Matsui, Lawrence, MA (US); Parviz Tayebati, Boston, MA (US); Daniel Mahgerefteh, Somerville, MA (US)

(73) Assignee: Finisar Corporation, Sunnyvale, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 11/787,163

(22) Filed: Apr. 13, 2007

(65) Prior Publication Data
US 2007/0286608 A1    Dec. 13, 2007

Related U.S. Application Data

(63) Continuation-in-part of application No. 11/441,944, filed on May 26, 2006, and a continuation-in-part of application No. 11/272,100, filed on Nov. 8, 2005, and a continuation-in-part of application No. 11/084,630, filed on Mar. 18, 2005, and a continuation-in-part of application No. 11/068,032, filed on Feb. 28, 2005, and a continuation-in-part of application No. 11/037,718, filed on Jan. 18, 2005, and a continuation-in-part of application No. 10/308,522, filed on Dec. 3, 2002.

(60) Provisional application No. 60/791,823, filed on Apr. 13, 2006.

(51) Int. Cl.
*H04B 10/04* (2006.01)

(52) U.S. Cl. ......................... 398/201; 398/185

(58) Field of Classification Search ............... 398/185, 398/201
See application file for complete search history.

(56) References Cited

U.S. PATENT DOCUMENTS

| | | | |
|---|---|---|---|
| 3,324,295 A | 6/1967 | Harris | |
| 3,973,216 A * | 8/1976 | Hughes et al. | 372/26 |
| 3,999,105 A | 12/1976 | Archey et al. | |
| 4,038,600 A | 7/1977 | Thomas et al. | |
| 4,561,119 A | 12/1985 | Epworth | |
| 4,754,459 A * | 6/1988 | Westbrook | 372/32 |
| 4,805,235 A | 2/1989 | Henmi | |
| 4,841,519 A | 6/1989 | Nishio | |
| 5,293,545 A | 3/1994 | Huber | |
| 5,325,378 A | 6/1994 | Zorabedian | |
| 5,371,625 A | 12/1994 | Wedding et al. | |
| 5,412,474 A | 5/1995 | Reasenberg et al. | |
| 5,416,629 A | 5/1995 | Huber | |
| 5,465,264 A | 11/1995 | Buhler et al. | |
| 5,477,368 A | 12/1995 | Eskildsen et al. | |
| 5,550,667 A | 8/1996 | Krimmel et al. | |
| 5,737,104 A | 4/1998 | Lee et al. | |
| 5,777,773 A | 7/1998 | Epworth et al. | |
| 5,805,235 A | 9/1998 | Bedard | |
| 5,856,980 A | 1/1999 | Doyle et al. | |
| 5,920,416 A | 7/1999 | Beylat et al. | |
| 5,953,139 A | 9/1999 | Nemecek et al. | |
| 5,974,209 A | 10/1999 | Cho et al. | |
| 5,991,323 A * | 11/1999 | Adams et al. | 372/50.1 |
| 6,081,361 A | 6/2000 | Adams et al. | |
| 6,096,496 A | 8/2000 | Frankel | |
| 6,104,851 A | 8/2000 | Mahgerefteh | |
| 6,115,403 A | 9/2000 | Brenner et al. | |
| 6,222,861 B1 | 4/2001 | Kuo et al. | |
| 6,271,959 B1 | 8/2001 | Kim et al. | |
| 6,298,186 B1 | 10/2001 | He | |
| 6,331,991 B1 | 12/2001 | Mahgerefteh | |
| 6,359,716 B1 | 3/2002 | Taylor | |
| 6,473,214 B1 * | 10/2002 | Roberts et al. | 398/183 |
| 6,506,342 B1 | 1/2003 | Frankel | |
| 6,577,013 B1 | 6/2003 | Glenn et al. | |
| 6,618,513 B2 | 9/2003 | Evankow, Jr. | |
| 6,654,564 B1 | 11/2003 | Colbourne et al. | |
| 6,665,351 B2 | 12/2003 | Hedberg et al. | |
| 6,748,133 B2 | 6/2004 | Liu et al. | |
| 6,778,307 B2 | 8/2004 | Clark | |

Progression of data through components of the transmitter chain

Schematic of the Chirp Managed Laser

| | | |
|---|---|---|
| 6,810,047 B2 | 10/2004 | Oh et al. |
| 6,836,487 B1 | 12/2004 | Farmer et al. |
| 6,847,758 B1 | 1/2005 | Watanabe |
| 6,947,206 B2 | 9/2005 | Tsadka et al. |
| 6,963,685 B2 | 11/2005 | Mahgerefteh et al. |
| 7,013,090 B2 | 3/2006 | Adachi et al. |
| 7,054,538 B2 | 5/2006 | Mahgerefteh et al. |
| 7,076,170 B2 | 7/2006 | Choa |
| 7,123,846 B2 | 10/2006 | Tateyama et al. |
| 7,263,291 B2 | 8/2007 | Mahgerefteh et al. |
| 7,280,721 B2 | 10/2007 | McCallion et al. |
| 2002/0154372 A1 | 10/2002 | Chung et al. |
| 2002/0159490 A1 | 10/2002 | Karwacki |
| 2002/0176659 A1 | 11/2002 | Lei et al. |
| 2003/0002120 A1 | 1/2003 | Choa |
| 2003/0067952 A1 | 4/2003 | Tsukiji et al. |
| 2003/0099018 A1 | 5/2003 | Singh et al. |
| 2003/0147114 A1 | 8/2003 | Kang et al. |
| 2003/0193974 A1 | 10/2003 | Frankel et al. |
| 2004/0008933 A1 | 1/2004 | Mahgerefteh et al. |
| 2004/0008937 A1 | 1/2004 | Mahgerefteh et al. |
| 2004/0036943 A1 | 2/2004 | Freund et al. |
| 2004/0096221 A1 | 5/2004 | Mahgerefteh et al. |
| 2004/0218890 A1 | 11/2004 | Mahgerefteh et al. |
| 2005/0100345 A1 | 5/2005 | Welch et al. |
| 2005/0111852 A1 | 5/2005 | Mahgerefteh et al. |
| 2005/0175356 A1 | 8/2005 | McCallion et al. |
| 2005/0206989 A1 | 9/2005 | Marsh |
| 2005/0271394 A1 | 12/2005 | Whiteaway et al. |
| 2005/0286829 A1 | 12/2005 | Mahgerefteh et al. |
| 2006/0002718 A1 | 1/2006 | Matsui et al. |
| 2006/0018666 A1 | 1/2006 | Matsui et al. |
| 2006/0029358 A1 | 2/2006 | Mahgerefteh et al. |
| 2006/0029396 A1 | 2/2006 | Mahgerefteh et al. |
| 2006/0029397 A1 | 2/2006 | Mahgerefteh et al. |
| 2006/0228120 A9 | 10/2006 | McCallion et al. |
| 2006/0233556 A1 | 10/2006 | Mahgerefteh et al. |
| 2006/0274993 A1 | 12/2006 | Mahgerefteh et al. |

FOREIGN PATENT DOCUMENTS

| | | |
|---|---|---|
| GB | 2 107 147 | 4/1983 |
| WO | 9905804 | 2/1999 |
| WO | 0104999 | 1/2001 |
| WO | 03005512 | 1/2003 |

OTHER PUBLICATIONS

Lammert et al, MQW DBR Lasers With Monolithically Integrated External-Cavity Electroabsorption Modulators Fabricated Without Modification of the Active Region, IEEE Photonics Technology Letters, vol. 9, No. 5, May 1997, pp. 566-568.*

Alexander et al., Passive Equalization of Semiconductor Diode Laser Frequency Modulation, Journal of Lightwave Technology, Jan. 1989, 11-23, vol. 7, No. 1.

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Hyryniewicz, J.V., et al., Higher Order Filter Response in Coupled MicroRing Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in MicroRing Resonators, Integrated Photonics Research Conference 2003.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutal et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

* cited by examiner

*Primary Examiner*—Leslie Pascal
(74) *Attorney, Agent, or Firm*—Workman Nydegger (57) ABSTRACT

A fiber optic communication system comprising:
  an optical signal source adapted to receive a binary base signal having a bit period T, and generate a first signal, wherein the first signal is frequency modulated; and
  an optical spectrum reshaper (OSR) adapted to reshape the first signal into a second signal, wherein the second signal is amplitude modulated and frequency modulated;
  characterized in that:
  the optical signal source is a laser in which frequency modulation is generated by modulating the loss of the laser cavity.

A method for transmitting a signal, comprising:
  receiving a binary base signal having a bit period T, and generating a first signal, wherein the first signal is frequency modulated; and
  reshaping the first signal into a second signal, wherein the second signal is amplitude modulated and frequency modulated;
  characterized in that:
  the first signal is frequency modulated by using a laser in which frequency modulation is generated by modulating the loss of the laser cavity.

A fiber optic communication system comprising:

an optical signal source adapted to receive a binary base signal having a bit period T, and generate a first signal, wherein the first signal is frequency modulated; and an optical spectrum reshaper (OSR) adapted to reshape the first signal into a second signal, wherein the second signal is amplitude modulated and frequency modulated;

characterized in that:

the optical signal source is a laser in which frequency modulation is generated by modulating the phase of the laser cavity.

18 Claims, 13 Drawing Sheets

Fig. 1 Schematic of the Chirp Managed Laser

Fig. 2 DBR laser with directly modulated electro-absorption loss section in the cavity for efficient FM generation Fig. 3 Dependence of lasing wavelength on threshold current demonstrates efficiency of using loss modulation in laser for FM generation.

$$\frac{\partial N}{\partial t} = \frac{I_{bias}}{e \cdot vol} - \frac{g}{1+\varepsilon S} S - BN^2 \quad \text{--- carriers}$$

$$\frac{\partial S}{\partial t} = \Gamma \frac{g}{1+\varepsilon S} S - \frac{S}{\tau_p} \quad \text{--- photons}$$

$$\frac{\partial \phi}{\partial t} = \frac{1}{2} \Gamma \frac{dn}{dN} \left( N - N_{ref} \right) + \text{PM} \quad \text{--- phase}$$

Fig. 4 Rate equations for a laser including loss modulation by modulation of photon lifetime Fig. 5 AM and FM response for conventional gain modulation Fig. 6 AM and FM response for loss modulation Fig. 7 AM and FM response for a +/-2% modulation of intra-cavity loss

AM and FM response as a function of time for loss modulation by a digital sequence of 1s and 0s.

Fig. 9 AM and FM response for pure intra-cavity phase modulation.

Fig. 10 AM and FM response for simultaneous intra-cavity loss and phase modulation

OPTICAL FM SOURCE BASED ON INTRA-CAVITY PHASE AND AMPLITUDE MODULATION IN LASERS

REFERENCE TO PENDING PRIOR PATENT APPLICATIONS

This patent application:

(i) is a continuation-in-part of pending prior U.S. patent application Ser. No. 11/272,100, filed Nov. 8, 2005 by Daniel Mahgerefteh et al. for POWER SOURCE FOR A DISPERSION COMPENSATION FIBER OPTIC SYSTEM;

(ii) is a continuation-in-part of pending prior U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR;

(iii) is a continuation-in-part of pending prior U.S. patent application Ser. No. 11/441,944, filed May 26, 2006 by Daniel Mahgerefteh et al. for FLAT DISPERSION FREQUENCY DISCRIMINATOR (FDFD);

(iv) is a continuation-in-part of pending prior U.S. patent application Ser. No. 11/037,718, filed Jan. 18, 2005 by Yasuhiro Matsui et al. for CHIRP MANAGED DIRECTLY MODULATED LASER WITH BANDWIDTH LIMITING OPTICAL SPECTRUM RESHAPER;

(v) is a continuation-in-part of pending prior U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT;

(vi) is a continuation-in-part of pending prior U.S. patent application Ser. No. 11/084,630, filed Mar. 18, 2005 by Daniel Mahgerefteh et al. for FLAT-TOPPED CHIRP INDUCED BY OPTICAL FILTER EDGE; and (vii) claims benefit of pending prior U.S. Provisional Patent Application Ser. No. 60/791,823, filed Apr. 13, 2006 by Yasuhiro Matsui et al. for OPTICAL FM SOURCE BASED ON INTRA-CAVITY PHASE AND AMPLITUDE MODULATION IN LASERS.

The seven (7) above-identified patent applications are hereby incorporated herein by reference.

FIELD OF THE INVENTION

This invention generally relates to semiconductor laser diodes used in optical fiber communication systems, and more particularly to the frequency modulation of such laser diodes for coding data being transmitted within such fiber optic communication systems, including chirp-managed directly modulated lasers.

BACKGROUND OF THE INVENTION

Optical communication systems based on frequency shift keying require lasers that can generate optical frequency modulation (FM) with high efficiency and a flat response from low frequencies up to the frequency comparable to the bit rate of the transmission systems, e.g., 1 MHz to 10 GHz for a 10 Gb/s digital signal.

Direct gain modulation of a semiconductor laser is a known, simple scheme to generate FM. It generally comprises the steps of biasing the laser with a DC bias so as to provide gain to the laser, and modulating this injected current about the DC bias so as to generate the desired FM. However, this method of FM generation is very inefficient. More particularly, a measure of FM efficiency is the ratio of the peak-peak frequency modulation (also sometimes referred to as adiabatic chirp) generated to the applied modulation current or the applied modulation voltage (as the case may be). For example, for a directly modulated laser in which the laser impedance is matched to 50 Ohms, the FM efficiency is typically about 3 GHz/V. Direct gain modulation generates frequency modulation (adiabatic chirp) through the physical mechanism sometimes called gain compression, spatial hole burning, and linewidth enhancement, which generates an index change for any associated gain change in the material. All of these processes are known in the art. Furthermore, FM modulation by gain modulation through current injection leads to the heating of laser cavity, which in turn causes the lasing frequency to red shift to lower frequencies on a slow time scale. This effect is sometimes called thermal chirp and typically has a frequency response of <20 MHz associated with the thermal diffusion and dissipation time constants. Thermal chirp, which is red shifted for an increase in drive signal, counteracts the desired adiabatic chirp, which generates a blue shift for the same signal. Thermal chirp can generate pattern dependence and can increase the bit error rate (BER) of a digital transmission system such as a chirp managed laser (CML) transmitter.

The quality and performance of a digital fiber optic transmitter is determined by the distance over which the transmitted digital signal can propagate without severe distortions. The bit error rate (BER) of the signal is measured at a receiver after propagation through dispersive fiber, and the optical power required to obtain a certain BER (typically $10^{-12}$), which is sometimes called the sensitivity, is determined. The difference in sensitivity at the output of the transmitter vis-á-vis the sensitivity after propagation is sometimes called the dispersion penalty. This is typically characterized by the distance over which a dispersion penalty reaches a level of ~1 dB. A standard 10 Gb/s optical digital transmitter, such as an externally modulated source, can transmit up to a distance of ~50 km in standard single mode fiber at 1550 nm before the dispersion penalty reaches a level of ~1 dB, which is sometimes called the dispersion limit. The dispersion limit is determined by the fundamental assumption that the digital signal is transform-limited, i.e., the signal has no time-varying phase across its bits and has a bit period of 100 ps, or 1/(bit rate), for the standard 10 Gb/s transmission. Another measure of the quality of a transmitter is the absolute sensitivity after fiber propagation.

Three types of optical transmitters are presently in use in prior art fiber optic systems: (i) directly modulated lasers (DML); (ii) Electroabsorption Modulated Lasers (EML); and (iii) Externally Modulated Mach Zhender modulators (MZ). For transmission in standard single mode fiber at 10 Gb/s, and 1550 nm, it has generally been assumed that MZ modulators and EMLs can have the longest reach, typically reaching approximately 80 km. Using a special coding scheme, sometimes referred to as the phase-shaped duobinary approach, MZ transmitters can reach approximately 200 km. On the other hand, directly modulated lasers (DML) typically reach <5 km because their inherent time-dependent chirp causes severe distortion of the signal after this distance.

Figure 1:
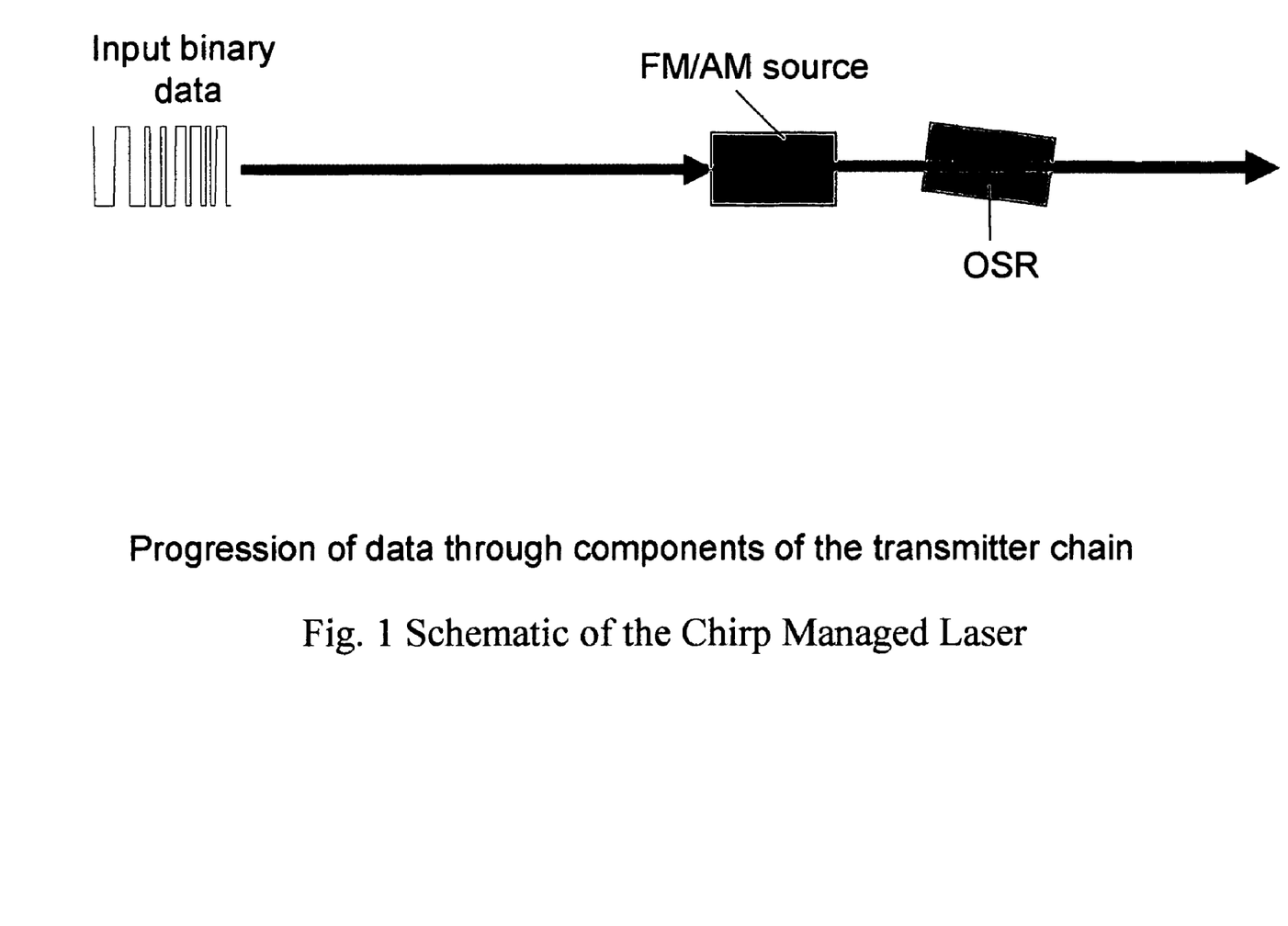
FIG. 1 is a schematic diagram showing a chirm managed laser transmitter.

Recently, various systems have been developed which provide long-reach lightwave data transmission (e.g., >80 km at 10 Gb/s) using DMLs. By way of example but not limitation, systems which increase the reach of DMLs to >80 km at 10 Gb/s in single mode fiber are disclosed in (i) U.S. patent application Ser. No. 11/272,100, filed Nov. 8, 2005 by Daniel Mahgerefteh et al. for POWER SOURCE FOR A DISPERSION COMPENSATION FIBER OPTIC SYSTEM; (ii) U.S. patent application Ser. No. 11/441,944, filed May 26, 2006 by Daniel Mahgerefteh et al. for FLAT DISPERSION FREQUENCY DISCRIMINATOR (FDFD); and (iii) U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR; which patent applications are hereby incorporated herein by reference. The transmitters associated with these novel systems are sometimes referred to as Chirp Managed Laser (CML)™ transmitters by Azna LLC of Wilmington, Mass. In these new CML systems, a Frequency Modulated (FM) source is followed by an Optical Spectrum Reshaper (OSR) which uses the frequency modulation to increase the amplitude modulated signal and partially compensate for dispersion in the transmission fiber. See FIG. 1, which shows a CML transmitter. In some preferred embodiments of these CML transmitters, the frequency modulated source may comprise a Directly Modulated Laser (DML). The Optical Spectrum Reshaper (OSR), sometimes referred to as a frequency discriminator, can be formed by an appropriate optical element that has a wavelength-dependent transmission function, e.g., a filter. The OSR can be adapted to convert frequency modulation to amplitude modulation.

The present invention is intended to enhance the performance of the aforementioned CML systems, among other things.

SUMMARY OF THE INVENTION

The present invention provides an optical frequency modulated (FM) source based on intra-cavity phase and amplitude modulation in lasers. And in one form of the present invention, this FM source may be used in a CML transmitter. More particularly, in one preferred form of the present invention, there is provided (i) a chirp managed laser (CML) comprising an FM source, and (ii) an optical spectrum reshaper (OSR) filter, wherein the desired FM is generated using intra-cavity loss modulation of the laser cavity. This approach for FM generation can be applied to a variety of laser designs, and a variety of methods can be used to modulate the loss of the cavity. In one preferred embodiment of the present invention, the laser is a distributed Bragg reflector (DBR) laser, and the loss of the laser cavity is directly modulated by an electro-absorption (EA) modulator, which is integrated in the laser cavity. Modulation of the cavity loss causes the carrier density in the gain section to change significantly, thereby generating large adiabatic chirp. This approach is highly advantageous, since it substantially reduces or eliminates thermal chirp within the laser, thereby increasing the FM efficiency of the system. This can provide a substantial improvement to the aforementioned CML systems.

In one form of the present invention, there is provided a fiber optic communication system comprising:

an optical signal source adapted to receive a binary base signal having a bit period T, and generate a first signal, wherein the first signal is frequency modulated; and an optical spectrum reshaper (OSR) adapted to reshape the first signal into a second signal, wherein the second signal is amplitude modulated and frequency modulated;

characterized in that:

the optical signal source is a laser in which frequency modulation is generated by modulating the loss of the laser cavity.

In another form of the present invention, there is provided a method for transmitting a signal, comprising:

receiving a binary base signal having a bit period T, and generating a first signal, wherein the first signal is frequency modulated; and reshaping the first signal into a second signal, wherein the second signal is amplitude modulated and frequency modulated;

characterized in that:

the first signal is frequency modulated by using a laser in which frequency modulation is generated by modulating the loss of the laser cavity.

In another form of the present invention, there is provided a fiber optic communication system comprising:

an optical signal source adapted to receive a binary base signal having a bit period T, and generate a first signal, wherein the first signal is frequency modulated; and an optical spectrum reshaper (OSR) adapted to reshape the first signal into a second signal, wherein the second signal is amplitude modulated and frequency modulated;

characterized in that:

the optical signal source is a laser in which frequency modulation is generated by modulating the phase of the laser cavity.

BRIEF DESCRIPTION OF THE DRAWINGS

These and other objects, features and advantages of the present invention will be more fully disclosed or rendered obvious by the following detailed description of the preferred embodiments of the invention, which is to be considered together with the accompanying drawings wherein like numbers refer to like parts and further wherein.

DETAILED DESCRIPTION OF THE PREFERRED EMBODIMENTS

Figure 2:
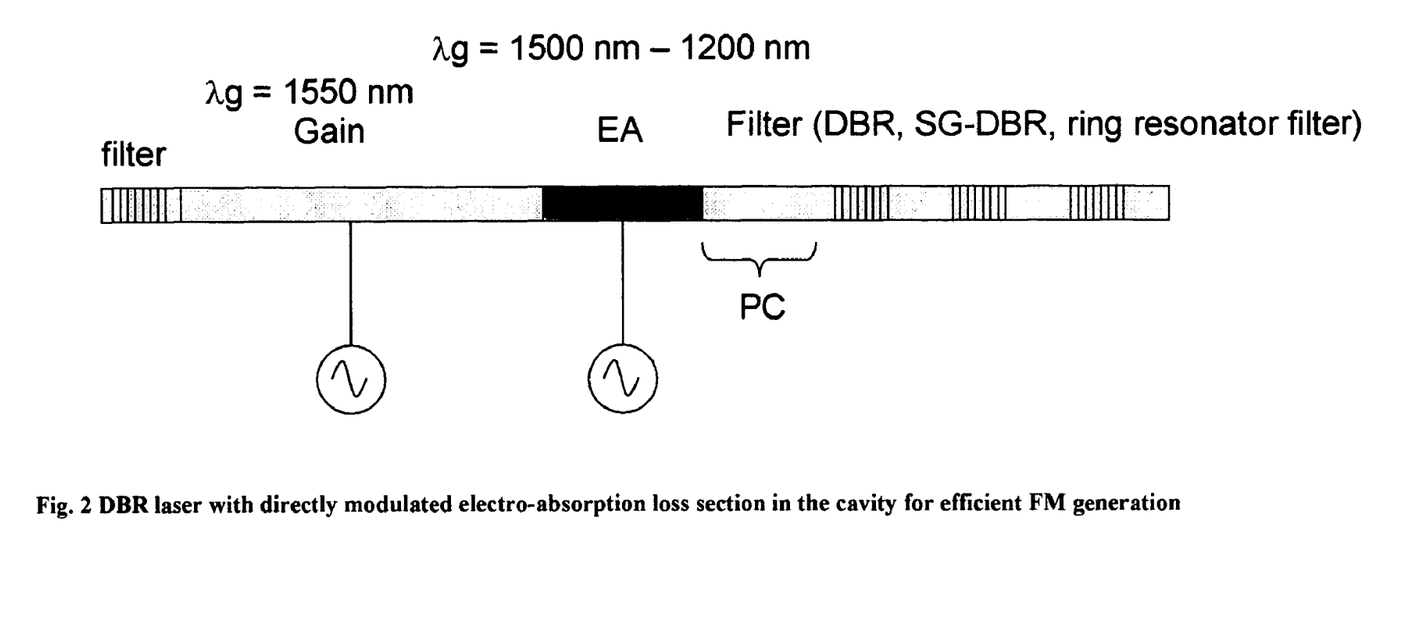
FIG. 2 is a schematic diagram showing a DBR laser having a directly modulated electro-absorption loss section in the cavity for efficient FM generation.

FIG. 2 shows one preferred embodiment of the present invention, wherein an electro-absorption (EA) modulator is integrated inside a distributed Bragg reflector (DBR) laser cavity. The EA section is reverse biased. Application of a reverse bias voltage to the EA increases cavity loss, which increases the threshold gain for lasing. This increases the threshold carrier density, which causes the laser frequency to shift towards the blue, i.e., so as to provide frequency modulation.

Figure 3:
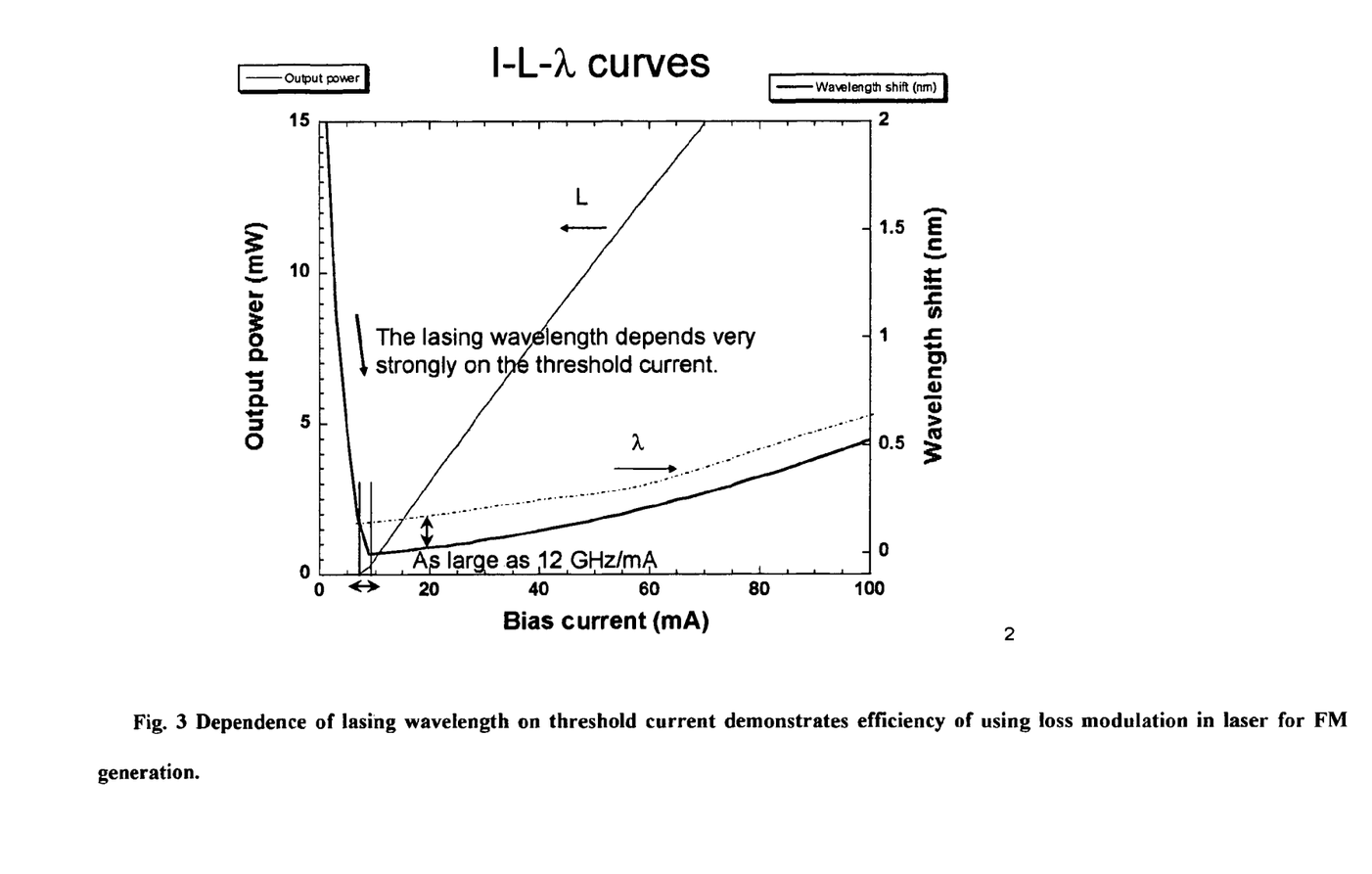
FIG. 3 shows the dependence of the lasing wavelength on threshold current and demonstrates the efficiency of using loss modulation in the laser for FM generation.

The large FM efficiency by loss modulation can be understood by considering FIG. 3, which shows the lasing wavelength as a function of injection current into a constant wave (CW) laser. It is known that the lasing wavelength of a CW semiconductor laser depends on the threshold current. Wavelength shifts to the blue as more carriers are injected into the laser below threshold. For example, the wavelength of the laser shifts by 0.2 nm (24 GHz) when the threshold current increases from 7 mA to 9 mA. This corresponds to a frequency shift efficiency of 12 GHz/mA, and indicates that intra-cavity loss modulation can be a very efficient way to generate FM in a laser.

Figure 4:
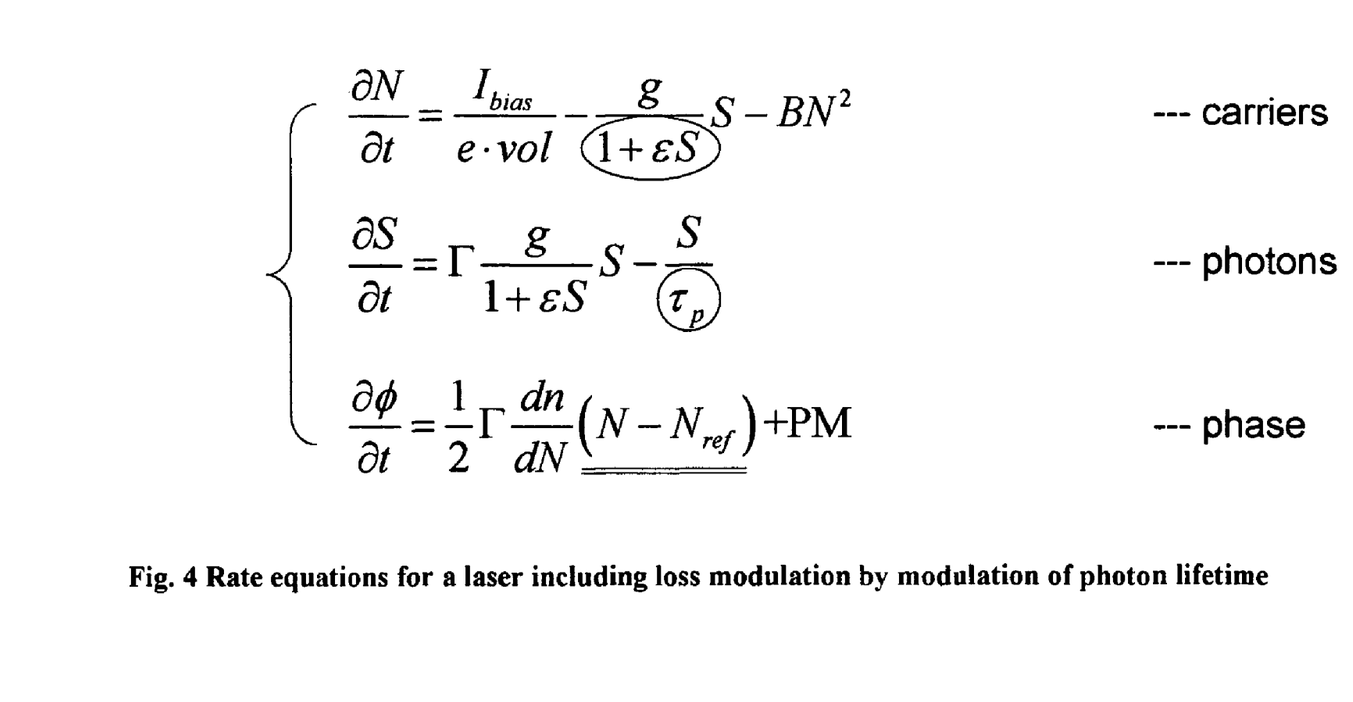
FIG. 4 shows rate equations for a laser, including loss modulation by modulation of photon lifetime.

A modification of the "standard rate equations model" for a semiconductor laser can demonstrate how loss modulation generates FM in the case of high speed modulation. FIG. 4 shows the set of rate equations for photons, carriers and phase, in which loss modulation is included by modulating the photon lifetime in the rate equation. Modulation of photon lifetime can be achieved by modulating the mirror loss of the cavity. Modulation of photon lifetime is one of several methods for modulating the intra-cavity loss of a laser to generate the desired FM modulation. Other methods are also available, e.g., mirror loss modulation, intra-cavity loss modulation using a saturable absorber, etc. Thus, photon lifetime modulation is used here in the rate equations in order to illustrate the result of loss modulation on the AM and FM response of a laser, but is not intended to indicate that only one such method is available.

Figure 5:
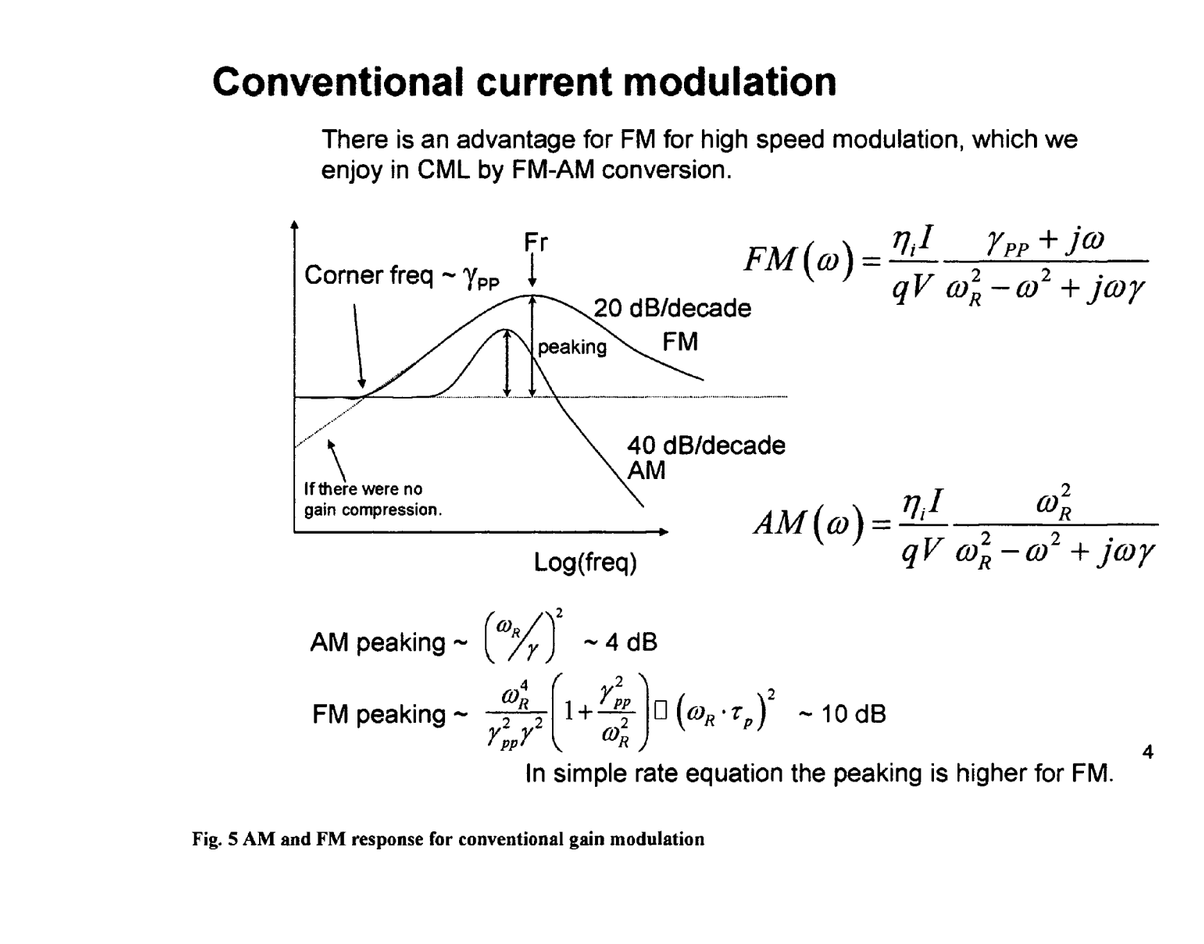
FIG. 5 illustrates AM and FM response for conventional gain modulation.

In order to elucidate the difference between conventional gain modulation and the loss modulation approach of the present invention, we can compare the small signal frequency response solutions of the rate equations for the two cases (i.e., conventional gain modulation and the loss modulation approach of the present invention). FIG. 5 describes the small signal frequency response to the rate equations for conventional high speed gain modulation of laser diodes, which produces amplitude modulation (AM) and frequency modulation (FM). As is known in the art, the AM response shows a peak at slightly lower frequency than a characteristic relaxation oscillation frequency, $f_r$, with a peak height of ~4 dB. The response rolls off beyond $f_r$ at a rate of 40 dB/decade. The FM response shows the peaking exactly at $f_r$, with a peak response of ~10 dB. The response rolls off beyond $f_r$ at a rate of 20 dB/decade. Therefore, with conventional current modulation of a laser diode, FM has a higher effective bandwidth.

Figure 6:
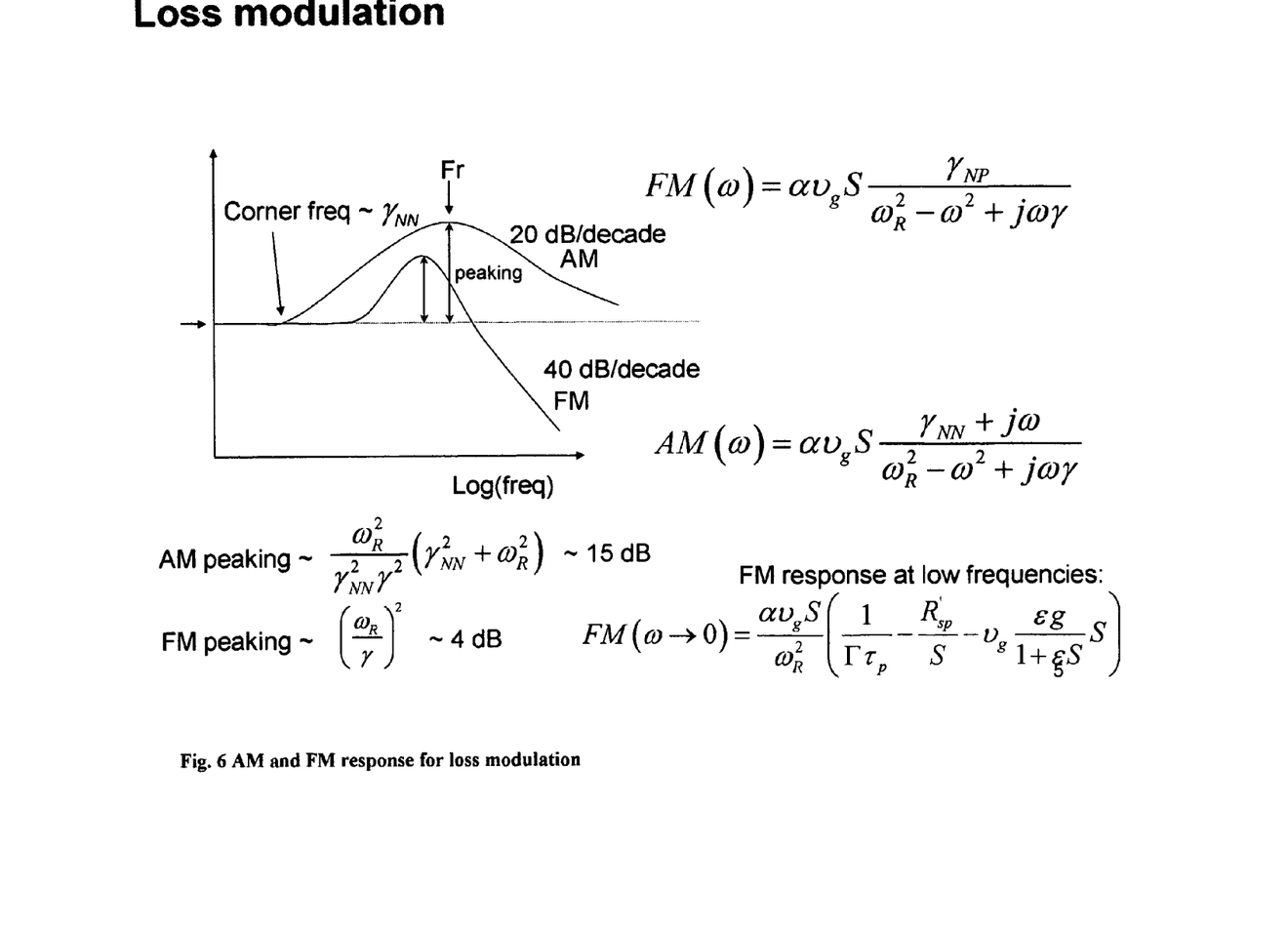
FIG. 6 illustrates AM and FM response for loss modulation.

In contrast, FIG. 6 shows the AM and FM response for intra-cavity loss modulation of a laser diode. In this case, the frequency response of AM and FM show reversed trends compared to that for conventional gain modulation. The AM response shows peaking at $f_r$, with a peak height of ~15 dB, and rolls off beyond $f_r$ at a rate of 20 dB/decade. The FM response shows a peak at a slightly lower frequency than $f_r$, with a peak response of ~4 dB. The response rolls off beyond $f_r$ at a rate of 40 dB/decade. Therefore, an enhancement in AM modulation bandwidth is expected for the intra-cavity loss modulation scheme, while FM modulation bandwidth will be lower than that for current modulation.

In another embodiment of the present invention, the FM response is enhanced by the addition of intra-cavity phase modulation.

Figure 7:
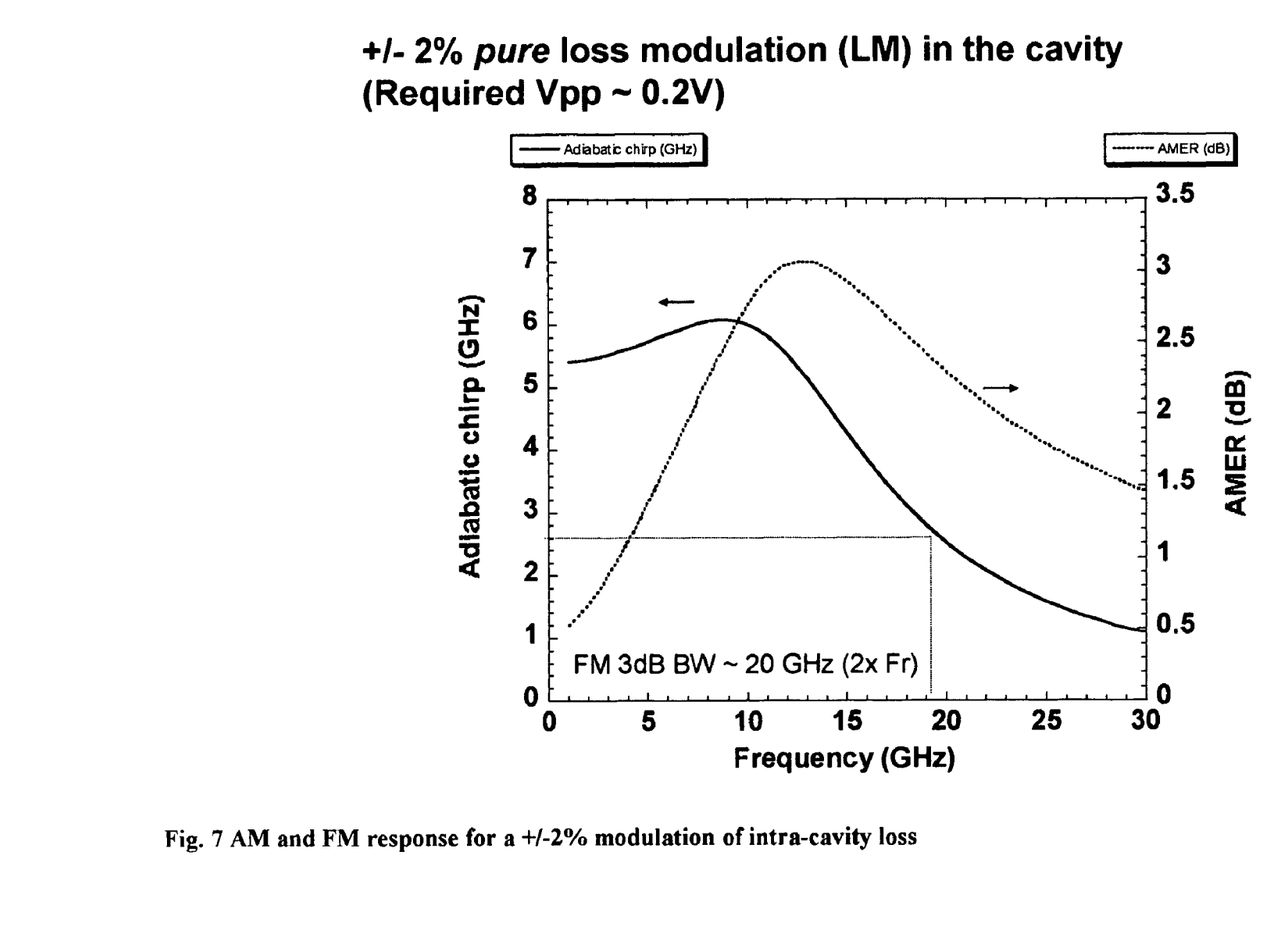
FIG. 7 illustrates AM and FM response for a +/−2% modulation of intra-cavity loss.

FIG. 7 shows the AM and FM response for +/−2% modulation in the intra-cavity loss. The corresponding modulation voltage for a typical EA modulator is ~0.2 Vpp. As the small signal analysis of the rate equation shows, the FM response shows relatively flat response up to the characteristic frequency $f_r$. The FM efficiency is as large as 5 GHz for the small modulation of 0.2 Vpp to the EA modulator section. The AM response shows the large peaking around $f_r$.

In one preferred embodiment of the present invention, the loss modulated FM source is used as the source in a chirp managed laser (CML), together with an optical spectrum reshaper (OSR) filter, as described in (i) U.S. patent application Ser. No. 11/037,718, filed Jan. 18, 2005 by Yasuhiro Matsui et al. for CHIRP MANAGED DIRECTLY MODULATED LASER WITH BANDWIDTH LIMITING OPTICAL SPECTRUM RESHAPER; (ii) U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT; and (iii) U.S. patent application Ser. No. 11/084,630, filed Mar. 18, 2005 by Daniel Mahgerefteh et al. for FLAT-TOPPED CHIRP INDUCED BY OPTICAL FILTER EDGE; which patent applications are hereby incorporated herein by reference.

Figure 8:
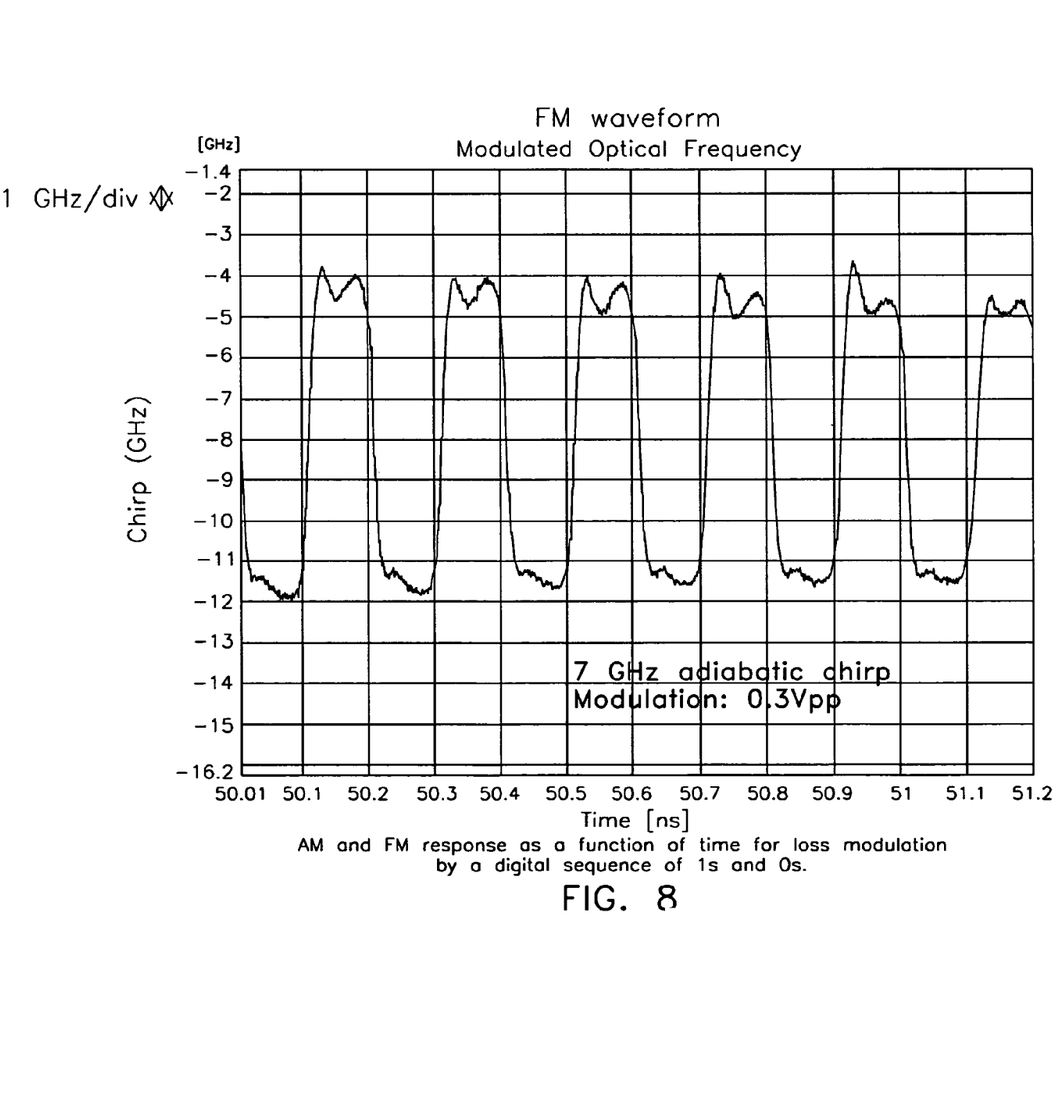
FIG. 8 illustrates AM and FM response as a function of time for loss modulation by a digital sequence of 1s and 0s.

FIG. 8 shows an example of modulation by a digital sequence, in which both AM and FM responses of a loss modulated laser are shown. FIG. 8 also shows the optical spectrum as well as the amplitude waveform after the signal has passed through an optical spectrum reshaper (OSR) filter, as prescribed in the chirp managed laser (CML) patent documents identified above. Among other things, the FM-to-AM conversion by the OSR filter increases the amplitude extinction ratio of the resulting signal.

Figure 9:
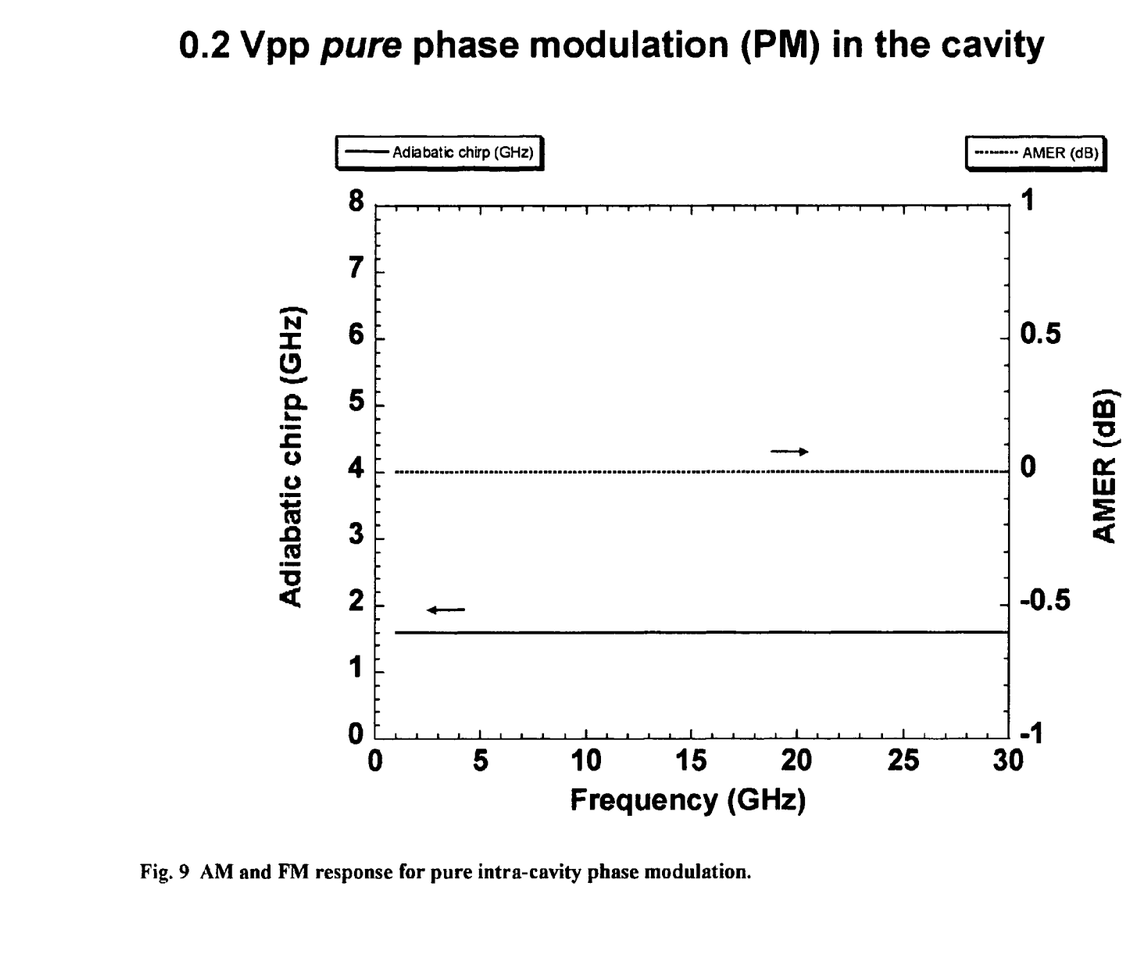
FIG. 9 illustrates AM and FM response for pure intra-cavity phase modulation.

In another embodiment of the present invention, and looking now at FIG. 9, only the phase is modulated inside the cavity. In this case, there is no AM modulation since gain is not affected, and the FM response can intrinsically be flat and only limited by the RC roll-off of the modulated section. As is evident in the rate equations, the phase of FM changes from 0 to π/2 as the modulation frequency is swept from DC beyond $f_r$. Since there is no timing delay between the modulation signal and the FM response generated by pure phase modulation in the cavity, the relative delay between loss-modulation induced FM and that induced by pure phase modulation changes with modulation frequency. At low frequency, both are π out of phase, since the sign of FM by loss modulation and phase modulation are opposite, assuming that the QCSE (or Franz-Keldysh) effect is used to generate phase modulation.

Figure 10:
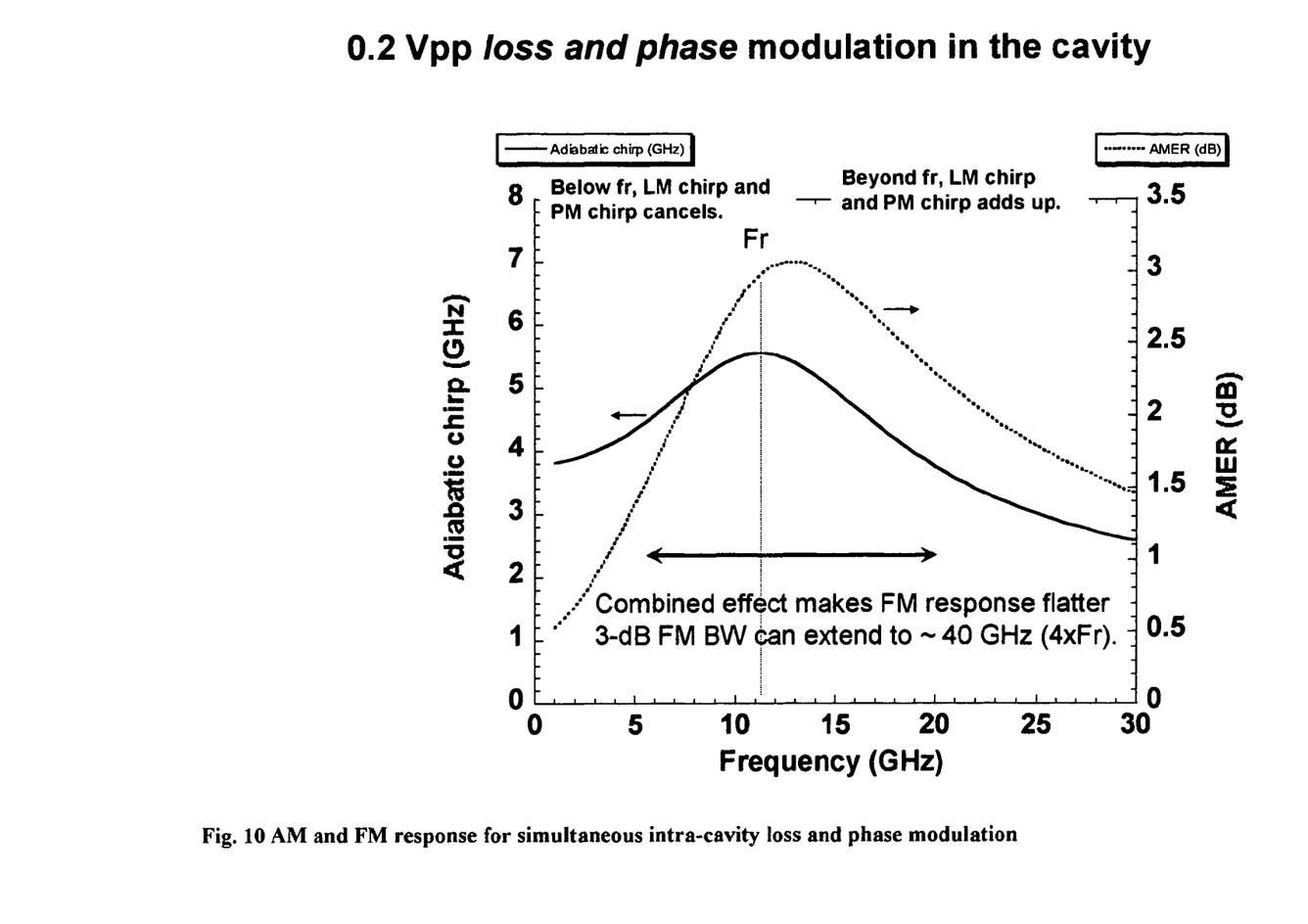
FIG. 10 illustrates AM and FM response for simultaneous intra-cavity loss and phase modulation.

FIG. 10 shows the case where both intra-cavity loss and phase modulation (which can be induced, for example, by reverse bias modulation in an EA section) are present. At low frequencies, the FM response drops as a result of competition between loss modulation and phase modulation in the EA section. At frequencies higher than $f_r$, the two effects add up so as to improve the FM response. It is, therefore, possible to design the FM response with a reasonably flat response up to approximately 40 GHz.

A variety of mechanisms can be used to induce modulation of loss in the cavity of a laser. These include, but are not limited to, (i) the quantum confined stark effect (QCSE); (ii) the Pockels effect; and (iii) the Franz-Keldysh effect. These are all different manifestations of a change in the absorption or index characteristics of a semiconductor material by the application of a voltage to the material, and are known in the art.

Intra-cavity loss modulation can be applied to a variety of monolithic laser designs. By way of example but not limitation, these include (i) distributed feedback (DFB) lasers; (ii) distributed Bragg reflector (DBR) lasers; (iii) sampled grating distributed Bragg reflector (SG-DBR) lasers; and (iv) Y branch DBR lasers. In each case, a new loss section of the laser needs to be added (e.g., an EA section or a saturable absorber section) in order to induce loss in the cavity. Alternatively, the mirror loss can be modulated in each case.

Other lasers can also be loss modulated so as to generate the desired FM. These include, but are not limited to, (i) external cavity lasers such as external cavity lasers with fiber Bragg gratings, ring resonators, planar lightwave circuit (PLC) Bragg gratings, arrayed waveguide gratings (AWG), and grating filters as external cavities; (ii) vertical cavity surface emitting lasers (VCSEL); and (iii) Fabry Perot lasers. All of the foregoing lasers, as well as other lasers, can also be loss modulated so as to generate the desired FM.

MODIFICATIONS

It will be understood that many changes in the details, materials, steps and arrangements of parts, which have been herein described and illustrated in order to explain the nature of the invention, may be made by those skilled in the art without departing from the principles and scope of the present invention.

What is claimed is:

1. A fiber optic communication system comprising:
   an optical signal source adapted to receive a binary base signal having a bit period T, and generate a first signal, wherein the first signal is frequency modulated; and
   an optical spectrum reshaper (OSR) adapted to reshape the first signal into a second signal, wherein the second signal is amplitude modulated and frequency modulated;
   characterized in that:
   the optical signal source is a laser in which frequency modulation is generated by modulating the loss of the laser cavity;
   wherein the frequency modulation excursion of the source is between 0.2 times ½ T and 0.8 times ½ T.

2. A system according to claim 1 wherein modulation of the loss in the laser cavity is achieved by a change in the absorption of a semiconductor material by the application of a voltage to that material.

3. A system according to claim 2 wherein modulation of the loss in the laser cavity is achieved by using one from the group consisting of (i) the quantum confined stark effect (QCSE); and (ii) the Franz-Keldysh effect.

4. A system according to claim 1 wherein the laser comprises one from the group consisting of (i) distributed feedback (DFB) lasers; (ii) distributed Bragg reflector (DBR) lasers; (iii) sampled grating distributed Bragg reflector (SG-DBR) lasers; and (iv) Y branch DBR lasers.

5. A system according to claim 1 wherein the laser comprises one from the group consisting of, (i) external cavity lasers (ii) vertical cavity surface emitting lasers (VCSEL); and (iii) Fabry Perot lasers.

6. A system according to claim 5, wherein the external cavity lasers include at least one of Bragg gratings, ring resonators, planar lightwave circuit (PLC) Bragg gratings, arrayed waveguide gratings (AWG), and grating filters as external cavities.

7. A method for transmitting a signal, comprising:
   receiving a binary base signal having a bit period T, and generating a first signal, wherein the first signal is frequency modulated; and
   reshaping the first signal into a second signal, wherein the second signal is amplitude modulated and frequency modulated;
   characterized in that:
   the first signal is frequency modulated by using a laser in which frequency modulation is generated by modulating the loss of the laser cavity;
   wherein the frequency excursion of the source is between 0.2 times ½ T and 0.8 times ½ T.

8. A method according to claim 7 wherein modulation of the loss in the laser cavity is achieved by a change in the absorption of a semiconductor material by the application of a voltage to the material.

9. A method according to claim 8 wherein modulation of the loss in the laser cavity is achieved by using one from the group consisting of (i) the quantum confined stark effect (QCSE); and (ii) the Franz-Keldysh effect.

10. A method according to claim 7 wherein the laser comprises one from the group consisting of (i) distributed feedback (DFB) lasers; (ii) distributed Bragg reflector (DBR) lasers; (iii) sampled grating distributed Bragg reflector (SG-DBR) lasers; and (iv) Y branch DBR lasers.

11. A method according to claim 7 wherein the laser comprises one from the group consisting of, (i) external cavity lasers (ii) vertical cavity surface emitting lasers (VCSEL); and (iii) Fabry Perot lasers.

12. A method according to claim 11, wherein the external cavity lasers include at least one of Bragg gratings, ring resonators, planar lightwave circuit (PLC) Bragg gratings, arrayed waveguide gratings (AWG), and grating filters as external cavities.

13. A fiber optic communication system comprising:
    an optical signal source adapted to receive a binary base signal having a bit period T, and generate a first signal, wherein the first signal is frequency modulated; and
    an optical spectrum reshaper (OSR) adapted to reshape the first signal into a second signal, wherein the second signal is amplitude modulated and frequency modulated;
    characterized in that:
    the optical signal source is a laser in which frequency modulation is generated by modulating the phase of the laser cavity;
    wherein the frequency modulation excursion of the source is between 0.2 times ½ T and 0.8 times ½ T.

14. A system according to claim 13 wherein the laser comprises one from the group consisting of, (i) external cavity lasers (ii) vertical cavity surface emitting lasers (VCSEL); and (iii) Fabry Perot lasers.

15. A system according to claim 14, wherein the external cavity lasers include at least one of Bragg gratings, ring resonators, planar lightwave circuit (PLC) Bragg gratings, arrayed waveguide gratings (AWG), and grating filters as external cavities.

16. A system according to claim 13 wherein modulation of the phase in the laser cavity is achieved by a change in the refractive index of a semiconductor material by the application of a voltage to that material.

17. A system according to claim 16 wherein modulation of the phase in the laser cavity is achieved by using one from the group consisting of (i) the quantum confined stark effect (QCSE); and (ii) the Pockels effect.

18. A system according to claim 13 wherein the laser comprises one from the group consisting of (i) distributed feedback (DFB) lasers; (ii) distributed Bragg reflector (DBR) lasers; (iii) sampled grating distributed Bragg reflector (SG-DBR) lasers; and (iv) Y branch DBR lasers.

* * * * *